US012683916B2

(12) United States Patent
Lazri et al.

(10) Patent No.: US 12,683,916 B2
(45) Date of Patent: Jul. 14, 2026

(54) SUPPORTING REAL NUMBER CALCULATIONS IN PHYSICAL SWITCHES

(71) Applicant: Orange, Issy-les-Moulineaux (FR)

(72) Inventors: Kahina Lazri, Chatillon Cedex (FR); Matthews Jose, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 67 days.

(21) Appl. No.: 18/728,709

(22) PCT Filed: Dec. 12, 2022

(86) PCT No.: PCT/EP2022/085309
§ 371 (c)(1),
(2) Date: Jul. 12, 2024

(87) PCT Pub. No.: WO2023/134934
PCT Pub. Date: Jul. 20, 2023

(65) Prior Publication Data
US 2025/0158939 A1 May 15, 2025

(30) Foreign Application Priority Data
Jan. 14, 2022 (FR) ...................................... 2200326

(51) Int. Cl.
*H04L 49/60* (2022.01)
*H04L 49/20* (2022.01)
*H04L 49/35* (2022.01)
(52) U.S. Cl.
CPC .............. *H04L 49/60* (2013.01); *H04L 49/20* (2013.01); *H04L 49/35* (2013.01)

(58) Field of Classification Search
CPC ..... H04L 49/10; H04L 49/109; H04L 49/112; H04L 49/113; H04L 49/20; H04L 49/35; H04L 49/60
See application file for complete search history.

(56) References Cited

U.S. PATENT DOCUMENTS

| | | | | |
|---|---|---|---|---|
| 2020/0322211 A1* | 10/2020 | Flodin | ..................... | G06F 16/23 |
| 2022/0014478 A1* | 1/2022 | Lee | ........................ | H04L 47/827 |
| 2022/0247617 A1* | 8/2022 | Pierre-Louis | ....... | H04L 41/0813 |
| 2024/0244014 A1* | 7/2024 | De Foy | ................... | H04L 45/74 |

OTHER PUBLICATIONS

Kunze Ike et al., "Investigating the Applicability of In-Network Computing to Industrial Scenarios", 2021 4th IEEE International Conference on Industrial Cyber-Physical Systems (ICPS), IEEE, May 10, 2021, pp. 334-340.

(Continued)

*Primary Examiner* — Kostas J Katsikis
(74) *Attorney, Agent, or Firm* — Knobbe, Martens, Olson & Bear, LLP

(57) ABSTRACT

A method for processing a packet via a physical switch of an electronic communications network, the method including the following acts implemented by the physical switch: receiving a packet; determining a result of applying an operation or a plurality of operations to at least one input value obtained from the packet by the physical switch; and depending on the result of applying the operation or the plurality of operations, performing an action on the packet.

18 Claims, 3 Drawing Sheets

(56)     References Cited

OTHER PUBLICATIONS

Jose Matthews et al., "InREC: In-network REal Number Compu-tation", 2021 IFIP/IEEE International Symposium on Integrated Network Management (1M), IFIP, May 17, 2021, pp. 358-366.

Sarvan Cagla et al., "Implementation of ANN Training Module on Field Programmable Gate Arrays", 2019 Innovations In Intelligent Systems and Applications Conference (ASYU), IEEE, Oct. 31, 2019, pp. 1-6.

João M P Cardoso et al., "Compiling for reconfigurable computing", ACM Computing Surveys, ACM, New York, NY, US, vol. 42, No. 4, Jun. 23, 2010, pp. 1-65.

International Search Report for International Application No. PCT/EP2022/085309, Mar. 3, 2023.

* cited by examiner

SUPPORTING REAL NUMBER CALCULATIONS IN PHYSICAL SWITCHES

CROSS-REFERENCE TO RELATED APPLICATIONS

This application is filed under 35 U.S.C. § 371 as the U.S. National Phase of Application No. PCT/EP2022/085309 entitled "SUPPORTING REAL NUMBER CALCULATIONS IN PHYSICAL SWITCHES" and filed Dec. 12, 2022, and which claims priority to FR 2200326 filed Jan. 14, 2022, each of which is incorporated by reference in its entirety.

BACKGROUND

Field

This development relates to the field of electronic communications networks, and in particular to the physical switches implemented in these networks.

It finds particular applications in the configuration of physical switches in order to process packets.

Description of the Related Art

Physical switches or simply switches are very limited in their calculation and memory capacities and have very strong constraints in terms of latency. A switch thus processes each packet it receives with a very limited number of steps or clock cycles (i.e. the minimum time unit during which the processor can process an elementary action or instruction). In current switches the number of steps or cycles does not exceed 12 cycles. During a clock cycle, the processor may process several instructions in parallel. However, the number of instructions that the processor can process in parallel depends greatly on the size of the processor's register, which again is very limiting in the processors used in physical switches.

These limitations of switch processors, and the need for very low latency so as not to affect the performance of services traveling through the network, force the switches to execute only scripts that involve very simple calculations and therefore to reduce the possibilities for programming the switches. Switch processors therefore can only calculate very simple functions, because:

- more complex functions require more resources, because it often involves more mathematical operations (for example addition, division, sine, etc.) requiring more cycles to perform these calculations; and/or
- more complex functions often require the use of real values during their calculation, otherwise there is a risk of errors.

Thus, in order to be able to execute scripts involving more complex calculations, switches can be programmed to transfer packets that are to undergo more complex processing, to a server which will carry out the complex calculations and will then transmit the packet. Such an implementation allows performing more complex calculations, and in particular is much less limited in the functions that can be used. However, such an implementation results in high latency and therefore cannot be used for all types of processing. It will therefore be used mainly for processing packets after the fact.

The article "InREC: In-network REal Number Computation" by M. Jose et al, published in the proceedings of the 2021 IFIP/IEEE International Symposium on Integrated Network Management (IM), proposes using lookup tables to perform operations on values expressed in real-valued representations such as floating point numbers described in the IEEE 754 standard. This makes it possible to implement logarithm or exponential types of operations. However, these real-valued representations require more clock cycles in order to process even basic operations such as addition, thus greatly reducing the number of operations that the complex function can include.

SUMMARY

The present development improves the situation.

A first aspect of the development relates to a method for packet processing via a physical switch of an electronic communications network, the method comprising the following:

The switch receives a packet;

The switch determines a result of applying an operation or a plurality of operations to at least one input value obtained from the packet by the switch, at least one of the operations corresponding to a lookup table, said lookup table representing mappings between input values of the table and output values of the table, the input values of the table being represented in a first real-valued representation encoded in a first set of bits comprising a first subset of bits representing an integer part and a second subset of bits representing a decimal part and/or the output values of the table being represented in a second real-valued representation encoded in a second set of bits comprising a first subset of bits representing an integer part and a second subset of bits representing a decimal part; and depending on the result of applying the operation or the plurality of operations, the switch performs an action on the packet.

When a script (for example a script written in a P4 programming language, also called Programming Protocol-Independent Packet Processors) based on a function is executed (or more precisely when the compiled version of the script is executed) at a switch, the switch will apply a series of operations corresponding to the script or deduced from the script. In a standard switch, these operations have integer values as inputs and outputs. Implementing these operations on real numbers encoded in a specific manner (i.e. the set of bits encoding each of these inputs/outputs breaks down into two subsets of bits, one representing an integer part and the other representing a decimal part) allows the switch to execute sets of operations forming more complex functions than those implemented in a conventional switch. Indeed, the real-valued representation makes it possible to perform exponential, logarithmic, or division operations, or even sine operations. In addition, the specific encoding of these real values makes it possible to reduce the number of steps (also called cycles) necessary for each operation, allowing more operations and therefore more complex functions to be applied or possibly reducing latency. Indeed, the number of steps allocated for performing the calculation that executes the script based on the function is very small in switches: in principle it is limited to 12 steps. Thus, if an operation requires only 2 steps with the specific real-valued representation (simply called real-valued representation hereinafter) instead of 4 steps (as is the case for addition with the floating-point numbers representation of the IEEE 754 standard):

either 10 steps remain available for performing the other operations instead of 8 steps, which makes it possible to implement more complex functions and more generally to allow the use of a greater choice of functions; or the number of total steps to implement the function will be reduced, and since each step takes the same amount of time, latency will be reduced.

Step is understood to mean a clock cycle during which the processor can only process one instruction at a time, or several instructions if they are all processed in parallel.

Physical switch is understood to mean a network switch, also simply called a switch, which connects several physical segments in an electronic communications network (for example a telecommunications network or computer network) or several physical segments between several electronic communications networks.

The switch receives a packet is understood to mean that the switch receives a packet at one of its input ports.

Packet is understood to mean the structure enabling the transmission of data in the network layer. A packet comprises a header and the data to be transmitted.

Value obtained from the packet is understood to mean a value obtained by the switch on the basis of the packet and which is therefore dependent on the packet, in other words the value depends on the characteristics of the packet (for example, the packet length), or on data contained in the packet in the header part and/or in the body of the packet (thus the value may be the source port recorded in the packet header).

Operation is understood to mean any operation performed by the switch, either natively (for example addition, permutation, bit shift to the left, bit shift to the right), i.e. the tasks to be carried out in order to execute the operation are already defined in the memory of the switch, or on the basis of a lookup table, i.e. for operations which correspond to a lookup table. When carried out natively, an operation may require several clock cycles (or several steps to be processed), meaning that such an operation is broken down into a succession of instructions applied one after the other. The operations carried out on the basis of the lookup table can each be processed by the processor in a single clock cycle.

Applying a plurality of operations to at least one value, i.e. a set of one or more values, is understood to mean that the composite operations which form a function are applied in an order dictated by the composition (there may be several corresponding orders of application for the function: for example, addition of a+b then multiplication by c or multiplication of a and b by c then addition of ac and bc). A first operation (or a set of first operations if these can be applied in parallel) is applied, then a second operation (or a set of second operations) is applied to the one or more results of the first operation(s) and so on until all operations in the composition are processed. This plurality of operations is processed by the switch (for example by means of the processor core, the processor register, and possibly volatile memory elements present in the switch). The operation or the plurality of operations performed by the switch corresponds to an algorithm which represents a function where the one or more inputs are values obtained from the packet.

Lookup table (LUT) is understood to mean a table which maps between input values and output values. Lookup tables represent mappings between table inputs and outputs. In other words, the lookup table is generated (or encoded in bits for example) on the basis of the mapping between its inputs and its outputs. These inputs and outputs are encoded in bits for example. These inputs and outputs may in particular be integers or real numbers. They may also comprise any type of information commonly encoded in the lookup tables implemented in network switches.

Operation corresponding to a lookup table is understood to mean that the result of the operation applied to one or more input values corresponds to the value (or indicated output value) indicated by the lookup table for said one or more input values.

Value (input or output) of a table represented in a real-valued representation is understood here to mean that the input value before being encoded in a set of bits in the table is a real number and that its encoding in this set of bits makes it possible to retain information about this value in addition to information concerning the integer part of this value. The specific real-valued representation implemented by the development subdivides the bits enabling the encoding of the value in the table, into bits representing the integer part and bits representing the decimal part.

Performing an action on the packet is understood to mean any action commonly performed in a physical or virtual switch, for example:

discarding the received packet, i.e. not transmitting it;

modifying the packet before transmitting it, for example by modifying the destination port;

transmitting the packet without modification.

The action is based on the result of applying a succession of operations, i.e. the action is dependent on the result; it is therefore understood that performing the action is either subordinate to the result of applying the succession of operations (for example the action is only applied for a certain result), or the action itself varies according to the result of the succession of operations (for example, the action consists of modifying the destination port of the packet by taking, as the new destination port, the value resulting from applying the succession of operations).

According to one embodiment, the determination of the action to be performed on the packet and/or the at least one input value obtained from the packet and/or the operation or the plurality of operations are based on at least one trigger value obtained from the packet by the switch.

For example, the trigger value is input into a lookup table (a match-action table) where the outputs are a function (representing the operation or the plurality of operations), input values to which to apply this function, and an action.

According to one embodiment, each lookup table $LUT_i$ corresponding to one of the operations among the plurality of operations represents mappings between input values of table $LUT_i$ and output values of table $LUT_i$, the input values of table $LUT_i$ being represented in a first real-valued representation $RVR_{1,i}$ encoded in a first set of bits $EB_{1,1,i}$ comprising a first subset of bits $SEB_{1,2,i}$ representing an integer part and a second subset bits $SEB_{1,2,i}$ representing a decimal part and/or the output values of the table being represented in a second real-valued representation $RVR_{2,i}$ encoded in a second set of bits $EB_{2,i}$ comprising a first subset of bits $SEB_{2,1,i}$ representing an integer part and a second subset of bits $SEB_{2,2,i}$ representing a decimal part.

Thus, all the lookup tables have at least their inputs or their outputs, or both, represented in real number form. This makes it possible to perform several operations with real numbers as input or as output or both.

Optionally, the operations which have as input the at least one input value (i.e. the one or more input values of the function that is applied by the switch) correspond to lookup tables $LUT_i$ in which the output values are represented in second real-valued representations $RVR_{2,i}$. In this case, the input values are integers, and the output values are equal to or respectively close to the input values. These operations are called real value transformation operations in the following. It is thus possible to transform the input values of the function so that all operations are performed on values expressed in real-valued representations.

Close to is understood to mean that the distance between the output values encoded in the second set of bits $EB_{2,i}$ and the input values encoded in the first set of bits $EB_{1,i}$ is less than a threshold, for example, strictly less than 0.5. The distance used may be for example the Cartesian distance.

A value represented in a real-valued representation encoded in a set of bits is encoded in this real-valued representation.

According to one embodiment, at least one output value from a lookup table corresponding to one of the operations among the operation or the plurality of operations is adapted by adding or subtracting a value E in order to minimize the difference between the result of applying the operation or the plurality of operations to the at least one input value and the result of the function that the operation or the plurality of operations represents when the function is applied to the at least one input value and is calculated with a greater precision than the precisions of the real-valued representations $RVR_{1,i}$,$RVR_{2,i}$.

It is thus possible to adapt the tables to reduce errors or differences between the desired result and the result of applying the operation or the plurality of operations as calculated by the switch. The output value and the adapted output value may be close. This optimization may be carried out in the same manner as the optimization carried out in neural networks, namely by minimizing a distance between the desired result and the obtained result.

Thus, the real value transformation operations may transform an integer into a value represented in a real-valued representation in which the integer part differs from the integer of the value E.

This is particularly advantageous, because it is often possible to adapt the output value of one of the lookup tables, in particular upwards for positive numbers and downwards for negative numbers, so that possible truncations due to the limit on the number of bits in the decimal parts of the real-valued representations in which the output values from the various operations are represented (and especially the output value of the last operation executed, i.e. the result of applying the operation or the plurality of operations) which come after the operation represented by the adapted lookup table, correspond to rounding off these decimal parts. The result is therefore more precise, and this makes it possible to reduce or eliminate the need for rounding procedures when such procedures are essential to preventing the result from being completely erroneous. However, these procedures consume many steps in the switch calculation process.

Result of the function applied to a value and calculated with a greater precision than the precisions of the real-valued representations $RVR_{1,i}$,$RVR_{2,i}$, is understood to mean that the function represented by the operation or the plurality of operations is calculated with real-valued representations having larger decimal parts and/or by performing rounding procedures during the calculation. Calculation of the function may in particular be carried out using processors adapted for numeric calculations. It is thus possible to determine the desired result to which to compare the result obtained when the switch (or an equivalent system) executes the operation or the plurality of operations.

According to one embodiment, the distribution of bits between the first subset of bits and the second subset of bits in the first set of bits is modified in order to minimize the difference between the result of applying the operation or the plurality of operations to the at least one input value and the result of the function that the operation or the plurality of operations represents when the function is applied to the at least one input value and is calculated with a greater precision than the precisions of the real-valued representations $RVR_{1,i}$,$RVR_{2,i}$; and/or the distribution of bits between the first subset of bits and the second subset of bits in the second set of bits is modified in order to minimize the difference between the result of applying the operation or the plurality of operations to the at least one input value and the result of the function that the operation or the plurality of operations represents when the function is applied to the at least one input value and is calculated with a greater precision than the precisions of the real-valued representations $RVR_{1,i}$,$RVR_{2,i}$.

It is thus possible to adapt, for each real-valued representation, the distribution of bits between the set representing the integer parts and the set representing the decimal parts, in order to reduce errors or differences between the desired result and the result of applying the operation or the plurality of operations as calculated by the switch. Indeed, when executing certain operations (for example, an operation representing exponentiation over the domain [–10; 0]), too small of a decimal part for the output values will not provide sufficient discrimination between these values, while conversely when executing certain operations (for example, an operation representing exponentiation over the domain [0; 10]), too small of an integer part for the output values will not allow all these values to be expressed. Thus, during the chain of operations, it is advantageous to adapt the distribution between bits representing the integer parts and bits representing the decimal parts for each table independently (i.e. the real-valued representations are adapted separately if necessary). This optimization may be achieved by minimizing a distance between the desired result and the result obtained when each distribution is modified.

Modifying the distribution of bits between the decimal part and the integer part is understood to mean that the number of bits assigned to the integer part is reduced to benefit the number of bits assigned to the decimal part, or that the number of bits assigned to the integer part is increased to benefit the number of bits assigned to the decimal part, the number of bits representing the value being constant during this modification.

According to one embodiment, the operations not corresponding to a lookup table are operations among addition, multiplication, permutation, and bit shift.

Addition, multiplication, and permutation are operations which are particularly adapted for application to values expressed in a real-valued representation in which the integer part is encoded in one set of bits and the decimal part is encoded in another set of bits. Indeed, when the distribution of bits between integer part and decimal part is the same for all input values to a same operation of this type, the operation can be executed independently of the distribution of bits between integer part and decimal part. In other words, the distribution of bits between integer part and decimal part does not affect the calculation of the operation. Other real-valued representations, for example the floating-point number representation of IEEE 754, do not allow the use of the operations noted above without applying additional transformations to the values in order to enable the operation to be applied, which increases the number of steps necessary to carry out the operation. Thus, according to the method proposed in the article referenced above, in order to add two numbers represented in the floating-point numbers representation of the IEEE 754 standard, the switch processor would require four steps, while in order to add two numbers represented in the real-valued representation as described herein, this requires only one step (or two if the two numbers have a different representation).

According to one embodiment, the second set of bits in which the second real-valued representation is encoded comprises a third subset of bits representing information dependent on the first subset of bits and/or on the second subset of bits, and the result of applying an operation or a plurality of operations is based on the information. For example, the result of a subsequent operation among the plurality of operations is based on the information, said subsequent operation being executed after the at least one operation corresponding to a lookup table.

It is thus possible to add additional information to the set of bits encoding the input or output values of an operation in a real-valued representation. This information makes it possible to reduce the number of instructions to be implemented by an operation which has these values as input. Thus, for example if this operation requires executing several instructions, the result of one of these instructions dependent on the data encoded in the first and second subsets may be pre-calculated and indicated in the third subset. It is then not necessary to execute this instruction in order to obtain the result of the operation, thus reducing the processing steps of the operation. The first set of bits in which the first real-valued representation is encoded may also comprise a third subset of bits representing information dependent on the first subset of bits and/or on the second subset of bits. The information encoded in the third subset of bits is advantageously a numerical value, for example a real value. Information dependent on a subset of bits is understood to mean that the information is obtained by applying an operation or an instruction to the value encoded by the subset of bits during the determination of the lookup table.

According to another aspect, a computer program is proposed comprising instructions for implementing all or part of a method as defined herein when these instructions are executed by a processor. According to another aspect of the development, a non-transitory computer-readable storage medium is proposed on which such a program is stored.

Another aspect of the development relates to a physical switch of an electronic communications network, the switch comprising:

an input port connected to an electronic communications network;

a processor; and a memory storing instructions, such that when these instructions are executed by the processor, they configure the switch for:

receiving a packet via the input port;

determining a result of applying an operation or a plurality of operations to at least one input value obtained from the packet by the switch, at least one of the operations corresponding to a lookup table, said lookup table representing mappings between input values of the table and output values of the table, the input values of the table being represented in a first real-valued representation encoded in a first set of bits comprising a first subset of bits representing an integer part and a second subset of bits representing a decimal part and/or the output values of the table being represented in a second real-valued representation encoded in a second set of bits comprising a first subset of bits representing an integer part and a second subset of bits representing a decimal part; and depending on the result of applying the operation or the plurality of operations, performing an action on the packet.

BRIEF DESCRIPTION OF THE DRAWINGS

Other features and advantages of the development will become apparent upon reading the description which follows. This is purely illustrative and is to be read in conjunction with the appended drawings, in which.

DETAILED DESCRIPTION OF CERTAIN ILLUSTRATIVE EMBODIMENTS

Figure 1:
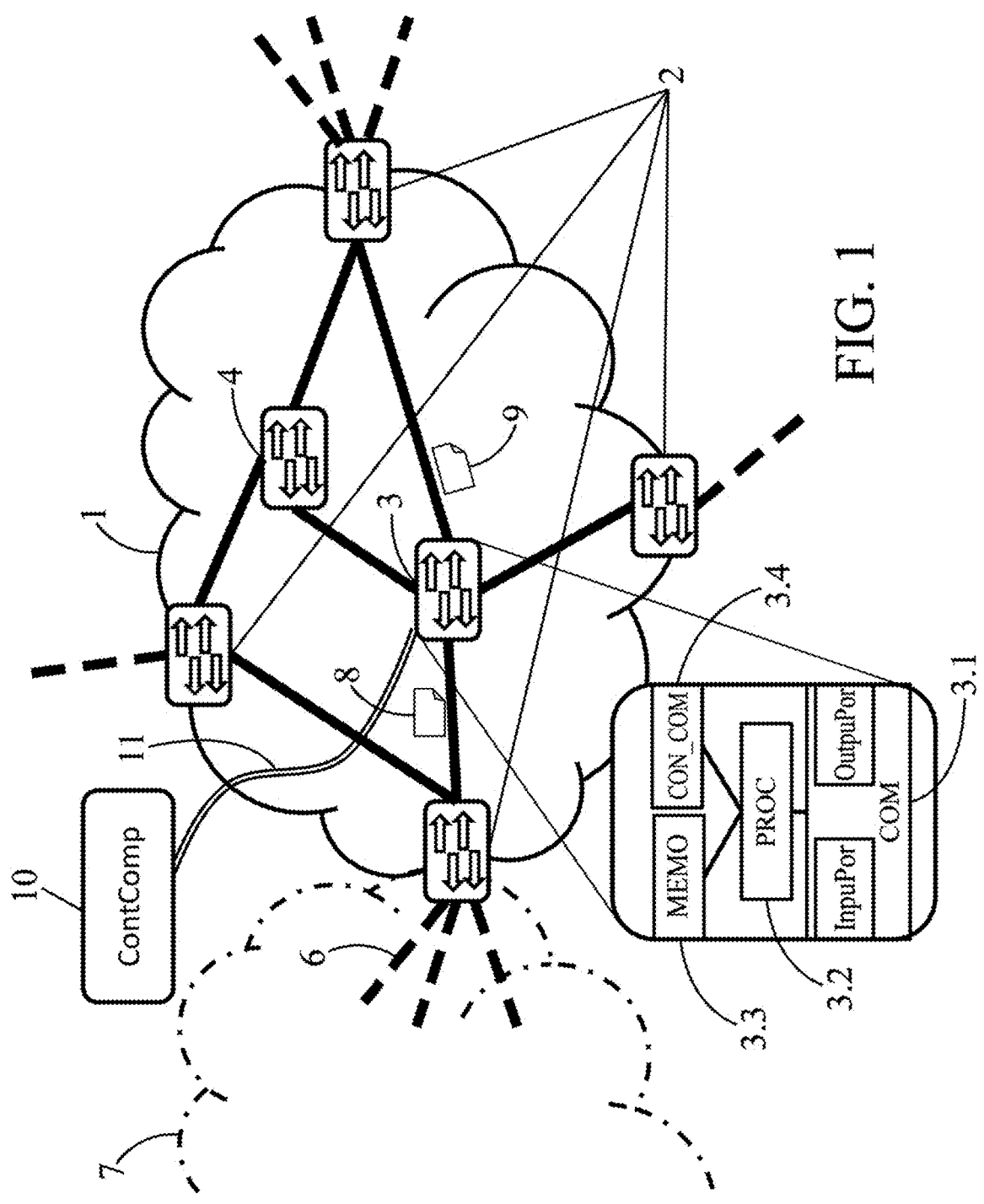
FIG. 1 illustrates switches according to the development.

In the example of FIG. 1, an electronic communications network 1 is described comprising switches 2, 3, 4, each of the switches interconnecting several physical segments 5 (for example cables or optical fibers) of the network. Signals representing packets 8, 9 are communicated from switch to switch, over these physical segments.

Some of switches 3, 4 only connect segments 5 internal to the network, other switches 2 connect segments 5 internal to the network with segments coming from other electronic communications networks 7.

The following takes place within the field of software-defined communications networks of the SDN type ("Software-Defined Networks"), in which a switch applies processing to a stream of packets using an RMT table ("Reconfigurable Match-Action Tables").

We will now describe the operation of a switch 3 in more detail. This description can easily be transposed to other switches. Switch 3 comprises a communications unit (COM) 3.1 comprising input ports and output ports. Switch 3 also comprises a processor (PROC) 3.2, a memory (MEMO) 3.3, and a control plane communication unit (CONT_COM) 3.4 for configuring switch 3.

Memory 3.3 comprises a non-volatile memory in which the computer program is stored and a volatile memory in which are stored the compiled script to be executed by the processor, lookup tables, and instructions relating to native operations.

Control plane communication unit 3.4 makes it possible to receive the compiled scripts as well as the lookup tables sent through a control plane by a computer 10.

Processor 3.2 is configured in particular to control communication unit 3.1 for receiving packets 8 and sending packets 9 in a data forwarding plane. Processor 3.2 is also configured to process packet 8: this processing is defined by a script and implements a succession of operations executed on the basis of lookup tables or sequences of instructions stored in volatile memory. Processing of packet 8 by switch 3 ends when the packet is sent (as in the case of packet 9) to another network entity, for example another switch, or when the packet is discarded.

Processors 3.2 implemented in physical switches 2, 3, 4 are processors specific to the switches allowing processing with very little latency; these are for example RISC type processors.

Computer 10 allows monitoring the activity of the various switches 2, 3, 4 of network 1 and configuring them, namely sending them the compiled scripts to be executed and the lookup tables enabling these scripts to be executed. Communication between control computer 10 and switches 2, 3, 4 takes place at the control plane via the same packets 8, 9 or via packets specific to control plane 11. Computer 10 may allow the network manager to write the scripts, compile them, and generate the lookup tables. However, these different tasks may be distributed across different entities.

Figure 2:
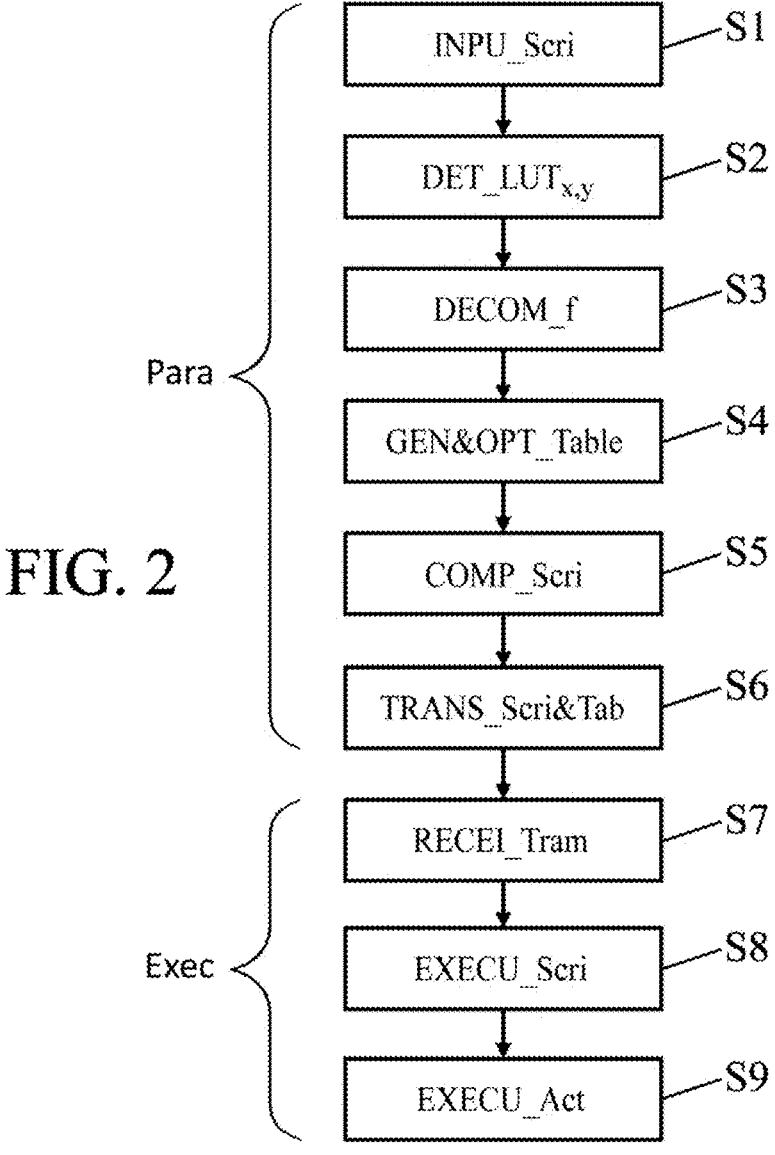
FIG. 2 illustrates a flowchart representing the method in one particular embodiment.

FIG. 2 represents a flowchart of a method according to one particular embodiment.

In step S1, the user enters into computer 10 a script relating to processing to be applied at the switch. This script indicates the packets to be processed, a rule to execute, and an action to be taken by the switch based on the rule. The rule includes a function and a domain for the function definition. This rule also includes a definition of the inputs used to calculate the result of this function. Thus, the rule establishes a function f and inputs to this function. The action is defined as dependent on the result of applying the rule.

For example, the function may be f(x,y), with x and y respectively representing a first and a second characteristic or value of a packet. For example, x may represent the size of the packet and y may represent the source port number of the packet. If the packets considered are TCP packets (for "Transmission Control Protocol"), the packet size can be between 0 and 32 bits. Thus, the range of x may be defined as the interval [0; 32]. For example, y may represent the source port of the received packet, the physical source port being the physical input port of the switch through which the packet entered the network.

The packets concerned, meaning those for which the rule will be applied, may for example be the packets whose source port is one of the physical port numbers [1, 2, 3, 6, 5] of the network, and whose destination port is physical port number 4, the physical destination port being the physical output port of the switch through which the packet will exit the network. The physical source port is the physical input port of the switch through which the packet will enter the network.

A lookup table is generated, based on the script indicating the packets concerned by the processing. This associates input values representing a characteristic of the packet or corresponding to values of the packet, with the first operation(s) to be executed in order to apply the rule.

In the case of the example, the action is defined based on the rule results, i.e. the result of calculating f(x,y). For example, a threshold $\delta$ is defined and the action may be defined for example as discarding the packet when the result is less than or equal to this threshold.

In the case of this example, f may be defined by the equation:

$$f(x, y) = \frac{1}{1 + 2^{x+y}}$$

Function f defined above is an example. The present description is not limited to this type of function. For example, f may have a single input x (e.g. log(x)) or a set of inputs (x, y, z . . . ).

In step S2, computer 10 determines, for each input, x, y, of function f, a lookup table which maps between the possible values of the inputs x (respectively y) of function f which are integers with values $\hat{x}$ (respectively $\hat{y}$) expressed in a real-valued representation $RVR_x$ (respectively $RVR_y$). The real-valued representation is a real representation of numbers over a certain number of bits, where one part of the bits, for example the first bits of this representation, represent the integer part of the real number and a second part, for example the subsequent bits of this representation, represent the decimal part of the real number.

Each of the inputs x, y may be represented in its own real-valued representation $RVR_x$, $RVR_y$. Thus, in the case of the example, two lookup tables are determined $LUT_x$ and $LUT_y$. The first $n_x$ bits of the real-valued representation used in $LUT_x$ may correspond to the integer part of the representation and the next $\overline{n_x}$ bits to the decimal part of the real-valued representation $RVR_x$ used in $LUT_x$. Similarly, the first $n_y$ bits of the real-valued representation used in $LUT_y$ may correspond to the integer part of the representation and the next $\overline{n_y}$ bits to the decimal part of the real-valued representation $RVR_y$ used in $LUT_y$.

Depending on the function f implemented, $n_x$ and $n_y$ may be different. In the example in FIG. 2, $n_x$ and $n_y$ are identical when the sum function x+y is not implemented in the form of a lookup table, but directly in the form of a native operation of the switch. In this example, $n_x$ and $n_y$ may also be different when the sum function x+y is implemented as a lookup table. In this case, the lookup table corresponding to x+y or to a set of operations including x+y (for example, $2^{x+y}$) takes into account the $RVR_x$ and $RVR_y$ representations used and therefore can adapt to differences in representations.

Any bit distributions between the integer part and the decimal part may be implemented. However, it is possible to choose optimized distributions based on the function implemented and on the possible inputs. This optimizes the precision of the calculated values and reduces errors in calculating the result of function f. This optimization is carried out in a subsequent step.

In addition, a value $\hat{x}_i$ (the real representation of an integer value $x_i$ obtained by means of lookup table $LUT_x$) and a value $\hat{y}_j$ (the real representation of an integer value $y_j$ obtained by means of lookup table $LUT_y$) may also differ even though the values of $x_i$ and $y_i$ are identical. In principle, the difference between the two values $\hat{x}_i$ and $\hat{y}_j$ will be small, but may be more significant when the sum function x+y is implemented in the form of a lookup table, i.e. the first operation performed on x and y is done using a lookup table and not a native operation. In this case, the lookup table corresponding to the operation x+y takes into account the differences induced by lookup tables $LUT_x$ and $LUT_y$ in the transformation of identical integers.

Distinctions may be made between mapped $LUT_x$, $LUT_y$ integer values and their real-valued representations in order to obtain more precise results once function f is applied to these values represented as real values. This optimizes the precision of the calculated values and reduces errors in calculating the result of function f. This optimization is carried out in a subsequent step.

More generally, for a same real-valued representation, for example $RVR_x$, each real-valued representation $\hat{x}_1$, $\hat{x}_2$ may be adapted separately. This makes it possible to adapt the input values to which the function will be applied and thus allows obtaining results for function f that are more precise or with fewer errors, in particular when the result of function f (or a subfunction of f) expressed in the real-valued representation does not correspond to rounding to the same number of decimal digits the result which would have been obtained with a real-valued representation having more bits and in particular more bits allocated to the decimal part.

The optimization of lookup tables $LUT_x$, $LUT_y$ (i.e. the optimization of values in the real-valued representation assigned to each integer) and of real-valued representations $RVR_x$, $RVR_y$ used (i.e. the optimization of the distribution of bits between the integer part and the decimal part) will be described in the optimization step.

In the example in FIG. 2, $\text{LUT}_x$ maps the possible values that x can take (namely values 0 to 32) to the same number of values, expressed in n bits in real-valued representation $\text{RVR}_x$. For example, if the real-valued representation is encoded in 32 bits, $n_x$ can be 16 and $\overline{n}_x$ can be 16. Thus, the first 16 bits of the real-valued representation represent the integer part of the real number and the next 16 the decimal part. The distance between the integer part of real-valued representation $\hat{x}_i$ and integer $x_i$ is small, i.e. the distance between the value $\hat{x}_i$ and the value $x_i$ is less than a threshold, for example strictly less than 0.5.

In the example in FIG. 2, $\text{LUT}_y$ maps the possible values of the source ports (namely values 0 to 18) to the same number of values, expressed in n bits in real-valued representation $\text{RVR}_y$. Here, to simplify the description, we will take $n_y$ equal to $n_x$, i.e. $n_y$ and $\overline{n}_x$ are equal to 16. The distance between the integer part of real-valued representation $\hat{y}_i$ and integer $y_i$ is small, i.e. the distance between the value $\hat{y}_i$ and the value $y_i$ is less than a threshold, for example strictly less than 0.5.

Determination of lookup tables $\text{LUT}_x$ and $\text{LUT}_y$ means generating these tables.

The values $\hat{x}$ and $\hat{y}$ correspond to binary writing, with one part representing the integer part and one part representing the decimal part. However, it is not necessary to have information indicating the position of the decimal point in the real-valued representation. This is because native operations are not affected by the placement of decimal points. Therefore the result of an operation, for example x+y, will be the same regardless of the decimal place in real-valued representations $\text{RVR}_x$, $\text{RVR}_y$, except when x and y have integer and decimal parts encoded in a different number of bits.

Figure 3:
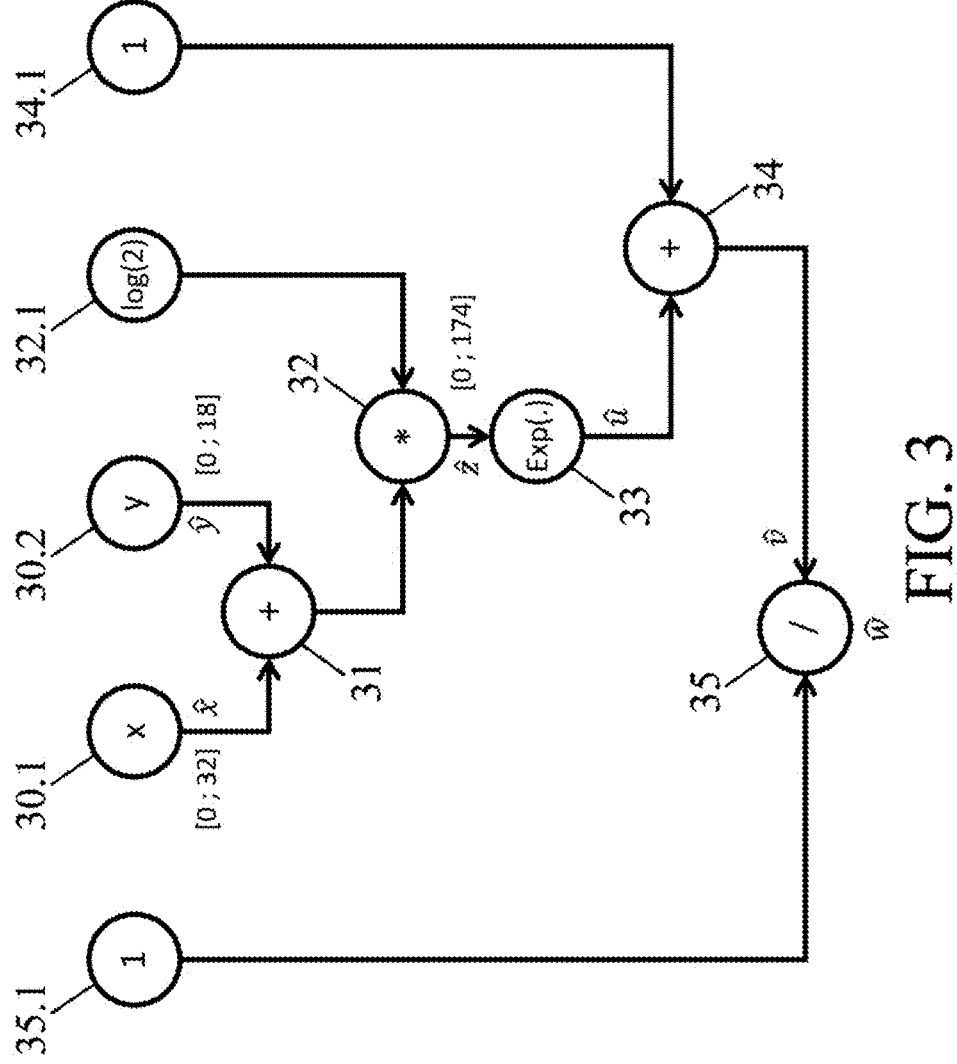
FIG. 3 illustrates a graph representing a decomposition of a function f into elementary operations.

In step S3, there is a decomposition of function f into elementary operations, by computer 10. As shown in FIG. 3, a representation in the form of a Directed Acyclic Graph type of graph may be employed to represent the function. Each node of the graph represents an elementary operation (for example an addition, a multiplication, a sine, a logarithm, etc.) and each edge of the graph represents the relationship between the two elementary operations of the two nodes connected by the edge (for example, the composition of these two elementary operations).

In the example of function f (x,y) defined by the previous equation, f can be broken down into operations such as addition 31, multiplication by a constant 32, exponentiation 33, addition with a constant 34, and inversion 35.

Addition 31, multiplication by a constant 32, and addition with a constant 34 may be natively implemented operations. Exponentiation 33 and inversion 35 are implemented using lookup tables.

Nodes 30.1 and 30.2 correspond to the lookup tables transforming x integers into $\hat{x}$ and y integers into $\hat{y}$ respectively. Nodes 32.1, 34.1 and 35.1 are nodes corresponding to constants.

In step S4, the lookup tables corresponding to the exponentiation and inverse operations are generated by computer 10.

Thus, the lookup table corresponding to the exponential operation associates, with each possible value of $\hat{z}$ (resulting from the sum of $\hat{x}$ with $\hat{y}$ multiplied by log(2) which are obtained by applying the operations implemented natively on the switch), a value represented in a real-valued representation $\text{RVR}_u$ close to the value from the calculation of the exponential function on $\hat{z}$. Close is understood to mean that the distance between the result of the exponential function on $\hat{z}$ and the value $\hat{u}$ is less than a threshold, for example 0.5.

In addition, the lookup table corresponding to the inverse operation associates, with each of the possible values of $\hat{v}$ (resulting from the sum of $\hat{u}$ with 1, obtained by applying an operation implemented natively on the switch), a value $\hat{w}$ represented in a real-valued representation $\text{RVR}_w$ close to the value from the calculation of the inverse function on $\hat{v}$. Close is understood to mean that the distance between the result of the inverse function on $\hat{v}$ and the value $\hat{w}$ is less than a threshold, for example 0.5.

These tables may be optimized by any known optimization technique. For example, for each pair of input values $(x_i, y_j)$ it is possible to associate a set of values $(\varepsilon_{i,j,k})_k$ which allow adapting the output values from the lookup tables concerned by the pair of input values $(x_i, y_j)$. Thus, the output value $\hat{x}_i$ from the lookup table corresponding to node 30.1 for input value $x_i$ may be replaced by the value $\hat{x}_i + \varepsilon_{i,j,1}$, the output value $\hat{y}_j$ from the lookup table corresponding to node 30.2 for input value $y_j$ may be replaced by the value $\hat{y}_j + \varepsilon_{i,j,2}$, the output value $\hat{u}_{i,j}$ of the lookup table corresponding to node 33 for the pair of input values $(x_i, y_j)$ may be replaced by the value $\hat{u}_{i,j} + \varepsilon_{i,j,3}$, the output value $\hat{w}_{i,j}$ of the lookup table corresponding to node 35 for the pair of input values $(x_i, y_j)$ may be replaced by the value $\hat{w}_{i,j} + \varepsilon_{i,j,4}$. Thus, for each input value n-tuple, here the pair of input values $(x_i, y_j)$, it is possible to associate a set $(\varepsilon_{i,j,k})_k$, here $\varepsilon_{i,j,1}$, $\varepsilon_{i,j,2}$, $\varepsilon_{i,j,3}$ and $\varepsilon_{i,j,4}$, serving as a parameter for performing the optimization of the lookup tables used. Each value $(\varepsilon_{i,j,k})_k$ is small, i.e. close to 0. Optimization consists of determining the set $(\varepsilon_{i,j,k})_k$ which minimizes the distance between the $\hat{w}$ values and the obtained values resulting from the calculation of function f on the input pairs (x,y) when this calculation is carried out with greater precision than the precisions of the real-valued representations $\text{RVR}_x$, $\text{RVR}_y$, $\text{RVR}_u$, $\text{RVR}_w$ used for calculations in the operations as described in FIG. 3 and with a processor adapted for numeric calculation. Once the set $(\varepsilon_{i,j,k})_k$ is determined, the optimized lookup tables are obtained by respectively replacing the values $\hat{x}_i$, $\hat{y}_j$, $\hat{u}_{i,j}$, $\hat{w}_{i,j}$ with the values $\hat{x}_i + \varepsilon_{i,j,1}$, $\hat{y}_j + \varepsilon_{i,j,2}$, $\hat{u}_{i,j} + \varepsilon_{i,j,3}$, $\hat{w}_{i,j} + \varepsilon_{i,j,4}$ for all pairs $(i,j) \in [0; 32] \times [0; 18]$.

In addition, it is also possible to optimize the distribution of bits between integer part and decimal part of each real-valued representation $\text{RVR}_x$, $\text{RVR}_y$, $\text{RVR}_u$, $\text{RVR}_w$ of the output values from the lookup tables. For example, several bit distributions are determined for each lookup table. For example, output values $\hat{x}$ are represented in three real-valued representations with different bit distributions $\text{RVR}^1_x$, $\text{RVR}^2_x$, $\text{RVR}^3_x$. Similarly, output values $\hat{y}$ are represented in three real-valued representations with different bit distributions $\text{RVR}^1_y$, $\text{RVR}^2_y$, $\text{RVR}^3_y$, and output values $\hat{u}$ are represented in three real-valued representations with different bit distributions $\text{RVR}^1_u$, $\text{RVR}^2_u$, $\text{RVR}^3_u$. Finally, output values $\hat{w}$ are represented in three real-valued representations with different bit distributions $\text{RVR}^1_w$, $\text{RVR}^2_w$, $\text{RVR}^3_w$. The combination of real-valued representations $\text{RVR}^t_x$, $\text{RVR}^{t'}_y$, $\text{RVR}^{t''}_u$, $\text{RVR}^{t'''}_w$ with the quadruplet $(t, t', t'', t''') \in \{1,2,3\}^4$ which minimizes the distance between the $\hat{w}$ values and the obtained values resulting from calculating function f on input pairs (x,y) when this calculation is carried out with a greater precision than the precisions of all the real-valued representations used for the calculations in the operations, is the combination of representations respectively implemented in the lookup tables representing nodes 30.1, 30.2, 33, 35.

The optimization which allows adapting the output values of the lookup tables and the optimization which allows determining the most appropriate bit distributions may be implemented successively, or even recursively.

The lookup tables may also be adapted to integrate, for each input or output value, information relating to this value, called additional information. Thus, for example, the real-valued representations $RVR_x$, $RVR_y$, $RVR_u$, $RVR_w$, may provide additional bits to encode this additional information. For example, these representations may be encoded in 40 bits, 8 of which are reserved for additional information. This additional information depends on the operations to be applied to the value relating to this information. For example, given that the output values of operation 33 are very large compared to 1 when $\hat{z}$ is large, we can approximate $\exp(\hat{z})+1$ by $\exp(\hat{z})$. It is then possible to indicate in $RVR_u$ representations encoding for the û values corresponding to the $\hat{z}$ values greater than a threshold, for example 5, the value of $1/\exp(\hat{z})$ as additional information. Thus, the value of $1/\exp(\hat{z})$ added in the $RVR_u$ representation may directly replace the result of the processing in operation 35, meaning that for large values of $\hat{z}$, the calculation $$\frac{1}{\exp(\hat{z}) + 1}$$

will not need to be performed.

The values resulting from operation 32 may also be represented in an $RVR_z$ representation, in which part encodes additional information. These values are the inputs to operation 33.

When one of the operations to be applied is the logarithm, the additional information added to the output value s from lookup table $T_{preop}$ representing the operation (for example, the operation which transforms a value encoded in an integer-value representation into a value encoded in a real-valued representation) preceding the logarithm may indicate an approximation of the logarithm for this value s. It is thus possible to indicate, as additional information encoded in the 8 bits, the integer value n such that $0 \le \log(s) - n < 1$. Since $$\log(s) = n + \log\left(\frac{s}{2^n}\right),$$

the operation representing the logarithm may thus be reduced to calculating $$\log\left(\frac{s}{2^n}\right), \frac{s}{2^n}$$

being between 1 and 2;

$$\log\left(\frac{s}{2^n}\right)$$

can be approximated by $$\frac{s}{2^n}$$

which reduces the complexity of the calculation.

In step S5, the script is compiled by computer 10.

In step S6, the compiled script and the lookup tables generated in steps S1 (lookup table relating to the packets concerned), S2 (lookup tables relating to the transformation of inputs into the real-valued representation), and S4 (lookup tables relating to operations which are not implemented natively on the switch) are transmitted to the physical switches, and in particular to physical switch 3, to be stored in its memory 3.3 and be executed by its processor 3.2.

The configuration of physical switch 3, carried out by steps S1 to S6, is then complete. Steps S1 to S6 may all be carried out by computer 10.

In step S7, switch 3 receives a packet 8 on one of its input ports.

In step S8, switch 3 executes the compiled script received in step S6.

Execution of the compiled script results in applying the first lookup table $LUT_{init}$ determined in step S1 (lookup table relating to the packets concerned) in order to determine whether packet 8 is concerned by the processing. Thus, a value corresponding to a characteristic of the packet or directly to one or more values of the packet are input into $LUT_{init}$. As output, lookup table $LUT_{init}$ then indicates the action to be applied and the rule (i.e. the succession of operations) to be executed. For example, the pair of values corresponding respectively to the source port and to the destination port of packet 8 is input to lookup table $LUT_{init}$, and if the pair of values belongs to the set $\{1, 2, 3, 6, 5\} \times \{4\}$ then the rule to execute and the action to apply are indicated as output from lookup table $LUT_{init}$.

Execution of the compiled script leads to applying operations, as described in FIG. 2, on the x and y values extracted from packet 8. For example, if packet 8 has a size of 32 bits and the source port of packet 8 is 6, integers x, y of packet 8 are respectively equal to 32 and 6. Transformation tables $LUT_x$ and $LUT_y$ (meaning the lookup tables relating to the transformation of the inputs of f into a real-valued representation determined in step S2) for x and y are applied respectively to the values 32 and 6. For example, $LUT_x$ maps the value 32 to the value 31.98561, and $LUT_y$ maps the value 6 to the value 6.00153. These two values $\hat{x}$ and $\hat{y}$ are respectively expressed in the form of real-valued representations $RVR^r_x$, and $RVR^r_y$ which have the same distributions between integer parts and decimal parts.

Next, the execution of the compiled script indicates the application of native operation 31, i.e. the addition of $\hat{x}$ and $\hat{y}$, for which the instructions are stored natively in switch 3. The instructions for performing the addition are the same as for an addition of two integers, i.e. adding together the bits of the same weight. However, when the real-valued representations in which the values to be added are encoded have different bit distributions, then the script may allow for an intermediate operation, for example to remove the last bit(s) of the decimal part and add the same number of zero bits in front of the other bits of the integer part. Switch 3 obtains the value 37.98714 as output from operation 31.

Execution of the script then indicates the application of native operation 32, i.e. the multiplication of the result obtained by log(2), for which the instructions are stored natively in switch 3. Switch 3 obtains the value 11.435268 as output from operation 32.

Execution of the script then indicates the application of operation 33, i.e. the application of the exponential function on $\hat{z}$. The script refers to table $LUT_u$ corresponding to operation 33 (generated and optimized in step S4 and stored in switch 3) in order to apply this exponential function. Table $LUT_u$ is applied to the value 11.435268. The output û from table $LUT_u$ is expressed in the form of real-valued representation $RVR^r_u$ having an integer part represented in a much larger number of bits than the decimal part, in order to be adapted for the exponential function. For example, the decimal part of û is encoded in 0 bits while the integer part of û is encoded in all available bits, i.e. 32 bits. Thus, table $LUT_u$ maps the value 11.435268 to the value 92,528 encoded in representation $RVR^{t''}{}_u$.

Next, execution of the compiled script indicates the application of native operation 34, i.e. the addition of û and 1, for which the instructions are stored natively in switch 3. Switch 3 obtains the the value 92,529 as output from operation 34.

Execution of the script then indicates the application of operation 35, i.e. the application of the inverse operation on v̂. The script refers to table $LUT_w$ corresponding to this operation 35 (generated and optimized in step S4 and stored in switch 3) in order to apply this operation. Table $LUT_w$ is applied to the value 92,527. The output ŵ from table $LUT_w$ is expressed in the form of real-valued representation $RVR^{t'''}{}_w$ having a decimal part represented in a much larger number of bits than the integer part in order be adapted for the inverse function, for which the output values are all between 0 and 1. For example, the integer part of û is encoded in 1 bit while the decimal part of û is encoded in all the remaining bits, namely 31 bits. Thus, table $LUT_w$ maps the value 92,529 to the value 0.000010807 encoded in representation $RVR^{t'''}{}_w$.

In step S9, execution of the compiled script then indicates a comparison of the value ŵ obtained by applying the various operations, with threshold δ (for example a threshold of 0.0005) defined in step S1. The comparison may be a native operation with instructions stored in switch 3, or a final lookup table $LUT_{fin}$ which associates 1 with the value ŵ if ŵ is greater than the threshold and 0 otherwise. Then the switch applies the action indicated by the script, based on the result of the comparison. In the example of packet 8, the value of ŵ is lower than threshold δ and therefore packet 8 is discarded; if the value of ŵ had been greater than threshold δ, packet 8 would have been sent to the segment leading to the destination port indicated in packet 8, as was the case for packet 9.

The invention claimed is:

1. A method of processing a packet via a physical switch of an electronic communications network, the method comprising the following acts implemented by the physical switch:

receiving a packet;

determining a result of applying an operation or a plurality of operations to at least one input value obtained from the packet by the physical switch, at least one of the operations corresponding to a lookup table, the lookup table representing mappings between input values of the table and output values of the table, the input values of the table being represented in a first real-valued representation encoded in a first set of bits comprising a first subset of bits representing an integer part and a second subset of bits representing a decimal part and/or the output values of the table being represented in a second real-valued representation encoded in a second set of bits comprising a first subset of bits representing an integer part and a second subset of bits representing a decimal part; and depending on the result of applying the operation or the plurality of operations, performing an action on the packet.

2. The method according to claim 1, wherein the determination of the action to be performed on the packet and/or the at least one input value obtained from the packet and/or the operation or the plurality of operations are based on at least one trigger value obtained by the physical switch from the packet.

3. The method according to claim 1, wherein the distribution of bits between the first subset of bits and the second subset of bits in the first set of bits is adapted in order to minimize the difference between the result of applying the operation or the plurality of operations to the at least one input value and the result of the function that the operation or the plurality of operations represents when the function is applied to the at least one input value and is calculated with a greater precision than the precisions of the real-valued representations $RVR_{1,i}, RVR_{2,i}$; and/or the distribution of bits between the first subset of bits and the second subset of bits in the second set of bits is adapted in order to minimize the difference between the result of applying the operation or the plurality of operations to the at least one input value and the result of the function that the operation or the plurality of operations represents when the function is applied to the at least one input value and is calculated with a greater precision than the precisions of the real-valued representations $RVR_{1,i}, RVR_{2,i}$.

4. The method according to claim 1, wherein each lookup table $LUT_i$ corresponding to one of the operations among the plurality of operations represents mappings between input values of table $LUT_i$ and output values of table $LUT_i$, the input values of table $LUT_i$ being represented in a first real-valued representation $RVR_{1,i}$ encoded in a first set of bits $EB_{1,1,i}$ comprising a first subset of bits $SEB_{1,1,i}$ representing an integer part and a second subset of bits $SEB_{1,2,i}$ representing a decimal part and/or the output values of the table being represented in a second real-valued representation $RVR_{2,i}$ encoded in a second set of bits $EB_{2,i}$ comprising a first subset of bits $SEB_{2,1,i}$ representing an integer part and a second subset of bits $SEB_{2,2,i}$ representing a decimal part.

5. The method according to claim 4, wherein the operation or operations among the plurality of operations which have as inputs the at least one input value, correspond to lookup tables $LUT_i$ in which the output values are represented in second real-valued representations $RVR_{2,i}$.

6. The method according to claim 1, wherein at least one output value from a lookup table corresponding to one of the operations among the operation or the plurality of operations is adapted by adding or subtracting a value E in order to minimize the difference between the result of applying the operation or the plurality of operations to the at least one input value and the result of the function that the operation or the plurality of operations represents when the function is applied to the at least one input value and is calculated with a greater precision than the precisions of the real-valued representations $RVR_{1,i}, RVR_{2,i}$.

7. The method according to claim 1, wherein the operations not corresponding to a lookup table are operations among addition, multiplication, permutation, bit shift to the left, and bit shift to the right.

8. The method according to claim 1, wherein the second set of bits in which the second real-valued representation is encoded comprises a third subset of bits representing information dependent on the first subset of bits and/or on the second subset of bits, and wherein the result of applying an operation or a plurality of operations is based on the information.

9. The method according to claim 8, wherein the result of a subsequent operation among the plurality of operations is based on the information, the subsequent operation being executed after the at least one operation corresponding to a lookup table.

10. The method according to claim 1, wherein the first set of bits in which the first real-valued representation is encoded comprises a third subset of bits representing information dependent on the first subset of bits and/or on the second subset of bits.

11. The method according to claim 1, wherein the action is one of discarding, modifying and transmitting, or transmitting the packet.

12. The method according to claim 11, wherein the distribution of bits between the first subset of bits and the second subset of bits in the first set of bits is adapted in order to minimize the difference between the result of applying the operation or the plurality of operations to the at least one input value and the result of the function that the operation or the plurality of operations represents when the function is applied to the at least one input value and is calculated with a greater precision than the precisions of the real-valued representations $RVR1,i,RVR2,i$; and/or the distribution of bits between the first subset of bits and the second subset of bits in the second set of bits is adapted in order to minimize the difference between the result of applying the operation or the plurality of operations to the at least one input value and the result of the function that the operation or the plurality of operations represents when the function is applied to the at least one input value and is calculated with a greater precision than the precisions of the real-valued representations $RVR1,i,RVR2,i$.

13. The method according to claim 11, wherein at least one output value from a lookup table corresponding to one of the operations among the operation or the plurality of operations is adapted by adding or subtracting a value E in order to minimize the difference between the result of applying the operation or the plurality of operations to the at least one input value and the result of the function that the operation or the plurality of operations represents when the function is applied to the at least one input value and is calculated with a greater precision than the precisions of the real-valued representations $RVR1,i,RVR2,i$.

14. A non-transitory computer-readable storage medium storing program code instructions, which when the program code instructions are executed by a processor, cause the processor to implement the method according to claim 1.

15. A physical switch of an electronic communications network, the physical switch comprising:

an input port connected to an electronic communications network;

a processor; and a memory storing instructions, such that when these instructions are executed by the processor, they configure the physical switch to:

receive a packet via the input port;

determine a result of applying an operation or a plurality of operations to at least one input value obtained from the packet by the physical switch, at least one of the operations corresponding to a lookup table, the lookup table representing mappings between input values of the table and output values of the table, the input values of the table being represented in a first real-valued representation encoded in a first set of bits comprising a first subset of bits representing an integer part and a second subset of bits representing a decimal part and/or the output values of the table being represented in a second real-valued representation encoded in a second set of bits comprising a first subset of bits representing an integer part and a second subset of bits representing a decimal part; and depending on the result of applying the operation or the plurality of operations, perform an action on the packet.

16. The physical switch of claim 15, wherein the action is one of discarding, modifying and transmitting, or transmitting the packet.

17. The physical switch of claim 15, wherein the distribution of bits between the first subset of bits and the second subset of bits in the first set of bits is adapted in order to minimize the difference between the result of applying the operation or the plurality of operations to the at least one input value and the result of the function that the operation or the plurality of operations represents when the function is applied to the at least one input value and is calculated with a greater precision than the precisions of the real-valued representations $RVR1,i,RVR2,i$; and/or the distribution of bits between the first subset of bits and the second subset of bits in the second set of bits is adapted in order to minimize the difference between the result of applying the operation or the plurality of operations to the at least one input value and the result of the function that the operation or the plurality of operations represents when the function is applied to the at least one input value and is calculated with a greater precision than the precisions of the real-valued representations $RVR1,i,RVR2,i$.

18. The physical switch of claim 15, wherein at least one output value from a lookup table corresponding to one of the operations among the operation or the plurality of operations is adapted by adding or subtracting a value $\varepsilon$ in order to minimize the difference between the result of applying the operation or the plurality of operations to the at least one input value and the result of the function that the operation or the plurality of operations represents when the function is applied to the at least one input value and is calculated with a greater precision than the precisions of the real-valued representations $RVR1,i,RVR2,i$.

* * * * *